(12) United States Patent
Numata et al.

(10) Patent No.: US 7,824,811 B2
(45) Date of Patent: Nov. 2, 2010

(54) FUEL CELL DISCHARGE-GAS PROCESSING DEVICE

(75) Inventors: Hideo Numata, Utsunomiya (JP); Akio Yamamoto, Utsunomiya (JP); Shujiro Nozaki, Shioya-gun (JP); Masahiro Matsutani, Utsunomiya (JP); Kazunori Fukuma, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1432 days.

(21) Appl. No.: 11/179,714

(22) Filed: Jul. 11, 2005

(65) Prior Publication Data
US 2006/0040158 A1 Feb. 23, 2006

(30) Foreign Application Priority Data
Jul. 13, 2004 (JP) ............................ P2004-205747
Jul. 13, 2004 (JP) ............................ P2004-205748

(51) Int. Cl.
*H01M 8/04* (2006.01)
(52) U.S. Cl. ...................................... 429/408; 429/400
(58) Field of Classification Search ........................ None
See application file for complete search history.

(56) References Cited

U.S. PATENT DOCUMENTS 4,982,460 A * 1/1991 Tobias et al. .................. 4/541.6

2004/0062975 A1* 4/2004 Yamamoto et al. ............ 429/34

FOREIGN PATENT DOCUMENTS

| JP | S54-54372 | | 4/1979 |
|---|---|---|---|
| JP | 2000-348743 | | 12/2000 |
| JP | 2002-289237 | | 10/2002 |
| JP | 2003-132915 | | 5/2003 |
| JP | 2003-142131 | | 5/2003 |
| JP | 2004-006183 | * | 1/2004 |
| JP | 2004-127621 | | 4/2004 |
| JP | 2004-127666 | | 4/2004 |
| JP | 2004-179102 | | 6/2004 |
| JP | 2005-011641 | * | 1/2005 |
| JP | 2006-031999 | | 2/2006 |

OTHER PUBLICATIONS

Communication from Japanese Patent Office, dated Jun. 25, 2010 (English-translation provided).

* cited by examiner

*Primary Examiner*—Jonathan Crepeau
*Assistant Examiner*—Tony Chuo
(74) *Attorney, Agent, or Firm*—Fish & Richardson P.C.

(57) ABSTRACT

A fuel cell discharge-gas processing device that dilutes anode off-gas discharged from a fuel cell anode by mixing the anode off-gas with a diluent gas so as to produce a diluted gas and then discharges mixture of the anode off-gas and the diluent gas, includes: a dilution container; an anode off-gas introduction path; a diluent gas path through; a diluent gas emission hole; a mixed gas discharge hole; at least one partition panel; and a communication gas path, wherein the anode off-gas emission hole is provided so as to emit anode off-gas toward the partition panel.

8 Claims, 4 Drawing Sheets

FUEL CELL DISCHARGE-GAS PROCESSING DEVICE

BACKGROUND OF THE INVENTION

1. Field of the Invention

The present invention relates to a discharge-gas processing device that carries out dilution processing of off-gas discharged from a fuel cell.

The present application claims priority on Japanese Patent Application No. 2004-205747, filed Jul. 13, 2004, and Japanese Patent Application No. 2004-205748, filed Jul. 13, 2004, the contents of which are incorporated herein by reference.

2. Description of Related Art

As a type of fuel cell to be installed in a fuel cell vehicle and the like, a fuel cell is known in which electrical power is generated through chemical reactions of reactant gases. Among such fuel cells, a type of fuel cell is known that provides an anode and a cathode on opposite sides of a solid polymer electrolyte membrane, supplies a fuel gas (e.g., hydrogen gas) to the anode and supplies an oxidizing gas (e.g., air containing oxygen) to the cathode so that chemical energy produced in an oxidation reduction reaction of these reactant gases is directly extracted as electrical energy.

In this type of fuel cell, water is formed at the cathode side by the power generation, and a portion of the formed water permeates the solid polymer electrolyte membrane so as to diffuse into the anode area. In addition, a trace quantity of nitrogen contained in air supplied to the cathode permeates the solid polymer electrolyte membrane so as to diffuse into the anode side, where it mixes with the hydrogen gas. The power generation in the fuel cell may become unstable due to impurities such as the water and nitrogen on the anode side.

In particular, in a circulation-type fuel cell system in which an unreacted hydrogen gas (anode off-gas) that is discharged from the fuel cell is recycled and supplied to the fuel cell again after being mixed with fresh hydrogen gas in order to increase fuel efficiency, the concentration of the above-mentioned impurities at the anode side tends to gradually increase.

In order to solve such a problem in this type of fuel cell, the concentration of the impurities contained in the anode off-gas is reduced by periodically opening an exhaust valve to discharge anode off-gas containing the impurities from the anode off-gas circulation path in which the anode off-gas circulates.

When the anode off-gas discharged from the anode off-gas circulation path is to be discharged to outside (the atmosphere), a discharge-gas processing device dilutes the anode off-gas with a diluent gas (e.g., air as the cathode off-gas that is discharged from the cathode) to reduce the hydrogen concentration and then discharges it.

Japanese Unexamined Patent Application, First Publication No. 2004-127666 discloses an example of a conventional discharge-gas processing device. In this discharge-gas processing device, an anode off-gas introduction pipe is connected to a substantially rectangular box-shaped dilution container, a liquid reservoir portion that protrudes outward in a rectangle is formed in the center of the bottom of the dilution container, a cathode off-gas pipe is passed through the dilution container with a portion of the cathode off-gas pipe in the dilution container being disposed in the liquid reservoir portion, drain holes are provided in the portion of the cathode off-gas pipe housed in the liquid reservoir portion, and gas discharge holes are provided in the portion of the cathode off-gas pipe not housed in the liquid reservoir portion.

In the conventional discharge-gas processing device constituted in this way, the cathode off-gas discharged from the cathode of the fuel cell is always flowing through the cathode off-gas pipe during operation of the fuel cell. Meanwhile, when there is a discharge demand, anode off-gas is introduced into the dilution container via the anode off-gas introduction pipe and stagnates there. The anode off-gas that stagnates within the dilution container is gradually sucked into the cathode off-gas pipe through the gas discharge holes, and diluted by being mixed with the cathode off-gas that flows through the cathode off-gas pipe, thereby becoming a mixed gas that flows downstream through the cathode off-gas pipe.

Japanese Unexamined Patent Application, First Publication No. 2004-6183 discloses another conventional discharge-gas processing device. In this discharge-gas processing device, a meandering path is formed by providing a partition panel in the dilution container, thereby enabling introduction of an anode off-gas at the starting end portion of the path via an anode off-gas introduction pipe and enabling introduction of a cathode off-gas via a cathode off-gas branch pipe that branches off from a cathode off-gas pipe. The anode off-gas is diluted by mixing with the cathode off-gas while flowing through this path, with the diluted gas being discharged to the cathode off-gas pipe from the terminal end portion of the path, where it is diluted by being further mixed with the cathode off-gas.

However, in either of the above-mentioned discharge-gas processing devices, measures must be taken to ensure that the anode off-gas emitted from the anode off-gas introduction pipe to the dilution container does not blow-through the inside of the dilution container by the emission force to be sucked into the gas discharge holes of the cathode off-gas pipe.

In the case of the conventional discharge-gas processing device disclosed in Japanese Unexamined Patent Application, First Publication No. 2004-127666, making the gas discharge holes in the cathode off-gas pipe small as a measure for preventing the blow-through gives rise to the problem that the timing of discharging the anode off-gas from the anode off-gas circulation path must be delayed due to the longer stagnation time in the dilution tank (that is to say, a longer time is required to lower the hydrogen concentration).

Also, in the case of the conventional discharge-gas processing device disclosed in Japanese Unexamined Patent Application, First Publication No. 2004-6183, flow control is required for the cathode-off gas introduced into the dilution container as a measure to prevent the blow-through. However, it is difficult to carry out flow control simply with the size of the holes for introducing cathode off-gas. When the flow of the cathode off-gas becomes too small, even if blow-through is prevented by oversupply of cathode off-gas, the problem arises of inadequate dilution of the anode off-gas in the dilution container. In addition, the water content of the anode off-gas stagnates in the dilution chamber, leading to the possibility of impeding gas flow.

Furthermore, in the discharge-gas processing device in Japanese Unexamined Patent Application, First Publication No. 2004-127666, the internal pressure of the dilution container increases rapidly when anode off-gas is introduced and when the introduction amount of the cathode gas increases due to a rise in output of the fuel cell. Also, since there is hardly any pressure buildup in the dilution container when the anode off-gas is not being introduced, the dilution container enters the so-called breathing state and deforms.

In the case of having a liquid reservoir portion that protrudes outward in a rectangle at the bottom of a substantially rectangular box-shaped dilution container as in the case of the aforementioned conventional discharge-gas processing device, in order to ensure pressure resistance at the corner portions and ensure sufficient strength against deformation (repetitive stress) due to breathing of the dilution container, it has been necessary to reinforce the dilution container by, for example, providing ribs in all directions. However, adopting such a reinforced structure leads to various disadvantages such as the structure of the discharge-gas processing device becoming complicated, manufacturing difficulties, and weight increase.

SUMMARY OF THE INVENTION

The present invention was achieved in view of the above circumstances, and provides a fuel cell discharge-gas processing device that can prevent blow-through of anode off-gas and discharge the anode off-gas with a sufficiently reduced hydrogen concentration, in addition to having a simple construction and excellent mechanical strength and drainage.

In order to solve the aforementioned problem, the present invention provides a fuel cell discharge-gas processing device that dilutes anode off-gas discharged from a fuel cell anode by mixing the anode off-gas with a diluent gas so as to produce a diluted gas and then discharges mixture of the anode off-gas and the diluent gas, including a dilution container; an anode off-gas introduction path having an anode off-gas emission hole that emits the anode off-gas to inside the dilution container; a diluent gas path through which the diluent gas flows, having drain holes for discharging liquid inside the dilution container; a diluent gas emission hole, communicating to the diluent gas path, that emits the diluent gas flowing through the diluent gas path to inside the dilution container; a mixed gas discharge hole, communicating to the diluent gas path, that discharges mixed gas of the anode off-gas and the diluent gas mixed inside the dilution container more to the downstream side of the diluent gas path than the communication portion with the diluent gas emission hole; at least one partition panel, provided at a substantially vertical orientation inside the dilution container, that divides the dilution container into an upstream chamber in which the anode off-gas introduction path and the diluent gas emission hole communicate, and a downstream chamber in which the mixed gas discharge hole communicates; and a communication gas path that communicates with the upstream chamber and the downstream chamber, wherein the anode off-gas emission hole is provided so as to emit anode off-gas toward the partition panel.

In the discharge-gas processing device, a portion of the diluent gas which flows through the diluent gas path is emitted from the diluent gas emission hole into the upstream chamber, and the anode off-gas is emitted from the anode off-gas emission hole of the anode off-gas introduction path into the upstream chamber. The anode off-gas emitted from the anode off-gas emission hole collides with the partition panel, altering its flow direction and reducing its flow speed by the collision with the partition panel to spread mostly throughout the upstream chamber at a moderate flow speed. Thereby, the anode off-gas partially mixes with the diluent gas in the upstream chamber while flowing into the downstream chamber through the communication gas path, heading toward the mixed gas discharge hole. In the meantime, further blending occurs between the mixed gas flowing from the upstream chamber and the gas in the downstream chamber. The gas in the downstream chamber is discharged to the diluent gas path from the mixed gas discharge hole, is diluted by mixing with the diluent gas flowing through the diluent gas path, and then discharged. The travel distance of the gas inside the dilution container can be lengthened by providing the partition panel. In addition, the collision of the anode off-gas against the partition panel prevents blow-through of the anode off-gas and can reduce the force of the anode off-gas at the time of its introduction. This can promote condensation of the steam in the anode off-gas and cause liquid adhering to the partition panel to travel across the vertically positioned partition panel and fall. Thereby, diluting and discharging the anode off-gas can be easily accomplished. Moreover, the existence of the partition panel simplifies collection of water in the anode off-gas at the bottom of the dilution container, so that discharge becomes easy.

In the aforementioned fuel cell discharge-gas processing device, it is preferable that the communication gas path be arranged at the upper portion of the dilution container, and that a gas discharge hole that discharges the gas in the dilution container to the outside is provided at the upper portion of the dilution container.

Such a constitution enables anode off-gas that collects at the upper portion of the dilution container during stoppage of the fuel cell to be easily discharged from the gas discharge hole. As a result, the anode off-gas in the dilution container can be prevented from flowing backward to the upstream side during stoppage.

In the aforementioned fuel cell discharge-gas processing device, it is preferable that the diluent gas emission hole be arranged in the vicinity of one end portion in the axial direction of the dilution container, and the mixed gas discharge hole is arranged in the vicinity of the other end portion in the axial direction of the dilution container.

Such a constitution can lengthen the travel distance of gas in the dilution container and thereby prolong the stagnation time of the gas so as to be able to ensure sufficient time necessary for dilution.

In the aforementioned fuel cell discharge-gas processing device, it is preferable that the diluent gas path be provided to penetrate the dilution container, and that at least one of the diluent gas emission hole and the mixed gas discharge hole is directly provided in the diluent gas path.

Such a constitution simplifies the structure of the discharge-gas processing device.

In order to solve the aforementioned problem, the present invention also provides a fuel cell discharge-gas processing device that dilutes anode off-gas discharged from a fuel cell anode by mixing the anode off-gas with a diluent gas so as to produce a diluted gas and then discharges mixture of the anode off-gas and the diluent gas, including a dilution container; an anode off-gas introduction path having an anode off-gas emission hole that emits the anode off-gas to inside the dilution container; a diluent gas path through which the diluent gas flows; a diluent gas emission hole, communicating to the diluent gas path, that emits the diluent gas flowing through the diluent gas path to inside the dilution container; a mixed gas discharge hole, communicating to the diluent gas path, that discharges mixed gas of the anode off-gas and the diluent gas mixed inside the dilution container more to the downstream side of the diluent gas path than the communication portion with the diluent gas emission hole; and a constriction portion provided in the diluent gas path and disposed between the region where the diluent gas emission hole communicates and the region where the mixed gas discharge hole communicates.

In the discharge-gas processing device, a portion of the diluent gas which flows through the diluent gas path is emitted from the diluent gas emission hole into the inside of the dilution container, and the anode off-gas is emitted from the anode off-gas emission hole of the anode off-gas introduction path into the inside of the dilution container. Thereby, anode off-gas and diluent gas are mixed within the dilution container. By setting the constriction state of the constriction portion in the diluent gas path to a prescribed value, the flow rate of diluent gas emitted from the diluent gas emission hole into the dilution container can be adjusted. Thereby, the diluent gas flow rate can be set to the optimal flow rate for dilution of the anode off-gas, and the anode off-gas can be discharged sufficiently diluted.

In the aforementioned fuel cell discharge-gas processing device, it is preferable for the anode off-gas emission hole and the diluent gas emission hole to be set in a mutually non-opposing spatial relationship.

Such a constitution can prevent anode off-gas emitted from the anode off-gas emission hole from flowing backward in the diluent gas path through the diluent gas emission hole, and so prevents discharge of insufficiently diluted anode off-gas.

In the aforementioned fuel cell discharge-gas processing device, it is preferable for the anode off-gas emission hole to be constituted with an opening end facing obliquely upward formed at the distal end of the anode off-gas introduction path inserted into the dilution container, with the diluent gas emission hole facing upward to the opening.

Such a constitution can prevent anode off-gas emitted from the anode off-gas emission hole from flowing backward in the diluent gas path through the diluent gas emission hole. In addition, this can prevent the accumulation of liquid at the distal portion of the anode off-gas introduction path.

In the aforementioned fuel cell discharge-gas processing device, it is preferable that the diluent gas path be provided to penetrate the dilution container, and that at least one of the diluent gas emission hole and the mixed gas discharge hole is directly provided in the diluent gas path.

Such a constitution simplifies the structure of the fuel cell discharge-gas processing device.

In order to solve the aforementioned problem, the present invention also provides a fuel cell discharge-gas processing device that dilutes anode off-gas discharged from a fuel cell anode by mixing the anode off-gas with a diluent gas so as to produce a diluted gas and then discharges mixture of the anode off-gas and the diluent gas, including a dilution container; an anode off-gas introduction path that emits the anode off-gas to inside the dilution container; a diluent gas path through which the diluent gas flows; a diluent gas emission hole communicating to the diluent gas path that emits the diluent gas flowing through the diluent gas path to inside the dilution container; a mixed gas discharge hole communicating to the diluent gas path that discharges mixed gas of the anode off-gas and the diluent gas mixed inside the dilution container more to the downstream side of the diluent gas path than the communication portion with the diluent gas emission hole; at least one partition panel provided inside the dilution container that divides the dilution container into an upstream chamber in which the anode off-gas introduction path and the diluent gas emission hole communicate, and a downstream chamber in which the mixed gas discharge hole communicates; and a communication gas path that communicates with the upstream chamber and the downstream chamber, wherein the diluent gas path is provided to penetrate the dilution container.

An effect similar to that stated above is obtained with this discharge-gas processing device.

In the aforementioned fuel cell discharge-gas processing device, it is preferable that the diluent gas path have drain holes for discharging liquid inside the dilution container.

An effect similar to that stated above is obtained with this discharge-gas processing device.

In order to solve the aforementioned problem, the present invention also provides a fuel cell discharge-gas processing device that dilutes anode off-gas discharged from a fuel cell anode by mixing the anode off-gas with a diluent gas so as to produce a diluted gas and then discharges mixture of the anode off-gas and the diluent gas, including a cylindrical dilution container having its axial center set in a substantially horizontal orientation and its cross-sectional shape perpendicular to the axial center direction composed of a curve; an anode off-gas introduction path that introduces the anode off-gas to inside the dilution container; a diluent gas path through which the diluent gas flows; a diluent gas emission hole communicating to the diluent gas path that emits the diluent gas flowing through the diluent gas path to inside the dilution container; a mixed gas discharge hole communicating to the diluent gas path that discharges mixed gas of the anode off-gas and the diluent gas mixed inside the dilution container more to the downstream side of the diluent gas path than the communication portion with the diluent gas emission hole; and drain holes communicating with the diluent gas path provided to open in the vicinity of the inner bottom of the dilution container.

In this discharge-gas processing device, since the cross-sectional shape of the dilution container is composed of a curve, the mechanical strength (pressure capacity) of the dilution tank can be sufficiently raised with respect to its internal pressure and deformation (repetitive stress) due to breathing of the dilution container without a special reinforcing structure.

Moreover, liquid inside the dilution container can be collected at the lowest portion inside the dilution container given the characteristics of the cross-sectional shape of the dilution container. Furthermore, the collected liquid can be discharged to the diluent gas path through the drain holes, to be discharged outside the dilution container along with the diluent gas. Therefore, liquid inside the dilution container can be discharged smoothly, thereby enhancing drainage performance.

In the aforementioned fuel cell discharge-gas processing device, it is preferable that the cross-sectional shape of the dilution container form a convex curve shape on the outside along the perimeter of the closed cross section.

Such a constitution can reliably collect liquid at the lowest portion of the dilution container in the vertical direction and can prevent the collection of liquid at other areas.

In the aforementioned fuel cell discharge-gas processing device, it is preferable that the cross-sectional shape of the dilution container have an elliptical shape, and that the long axis of this ellipse is arranged in the vertical direction.

Such a constitution can quicken the flow speed of liquid that runs down the inner walls of the dilution container. Moreover, it also enables easy collection of the liquid that has run down. Accordingly, liquid can be swiftly collected at the lowest portion of the dilution container, thereby enabling quick drainage. In addition, since run down liquid can be easily collected, even small amounts of liquid can be drained.

In the aforementioned fuel cell discharge-gas processing device, it is preferable that a constriction portion be provided in the diluent gas path between the region where the diluent gas emission hole communicates and the region where the mixed gas discharge hole communicates, and that the drain holes communicate more to the downstream side of the diluent gas path than the constriction portion.

Such a constitution can increase the suction force on the liquid in the drain holes and effectively suck up liquid accumulated inside the dilution container, since the pressure is lower downstream of the constriction portion than upstream thereof. Therefore, liquid can be swiftly discharged.

In addition, by setting the constriction state of the constriction portion in the diluent gas path to a prescribed value, the flow rate of diluent gas emitted from the diluent gas emission hole into the dilution container can be adjusted. Thereby, the diluent gas flow rate can be set to the optimal flow rate for dilution of the anode off-gas, and the anode off-gas can be discharged sufficiently diluted.

In the aforementioned fuel cell discharge-gas processing device, it is preferable that the diluent gas path be provided along the inner bottom of the dilution container, that the diluent gas emission hole, the mixed gas discharge hole and the drain holes are all directly provided in the diluent gas path, and that the drain holes are provided in the lower half portion of the diluent gas path.

Such a constitution simplifies the structure of the discharge-gas processing device, and, moreover, enables the drain holes to be disposed near the inner bottom portion of the dilution container. Also, the liquid which remains in the dilution container without being drained can be reduced, thereby enhancing the drainage performance.

DETAILED DESCRIPTION OF THE INVENTION

Figure 1:
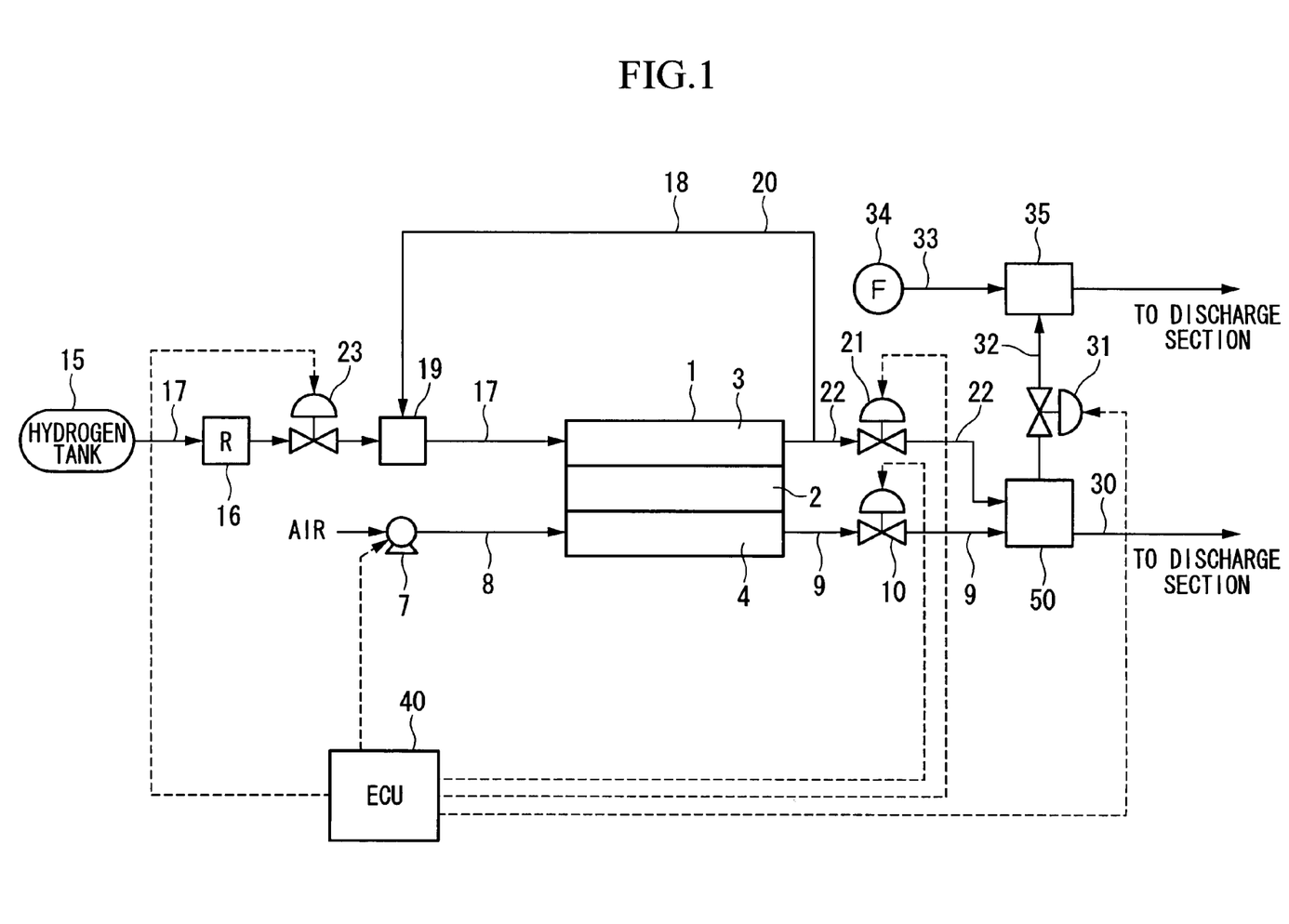
FIG. 1 is a schematic lineblock diagram showing an embodiment of a fuel cell system equipped with the discharge-gas processing device of the present invention.

Embodiments of the fuel cell discharge-gas processing device of the present invention shall be explained hereinbelow referring to the drawings of FIG. 1 to FIG. 4. FIG. 1 is a schematic lineblock diagram of a fuel cell system equipped with the discharge-gas processing device according to this invention, which in this embodiment is mounted in a fuel cell vehicle.

A fuel cell 1 is of the type that obtains electrical power through chemical reactions of reactant gases. It is constituted by, for example, laminating a plurality of cells formed by sandwiching a solid polymer electrolyte membrane 2 including a solid polymer ion exchange membrane etc. between an anode 3 and a cathode 4 (shown by the single cell in FIG. 1). When hydrogen gas (reactant gas) is supplied to the anode 3 as a fuel gas, and air containing oxygen (reactant gas) is supplied to the cathode 4 as an oxidizing agent gas, hydrogen ions generated by a catalytic reaction in the anode 3 pass the solid polymer electrolyte membrane 2 and travel to the cathode 4, where electricity is generated by the electrochemical reaction with the oxygen and water is produced. Since a portion of the produced water generated at the cathode side penetrates the solid polymer electrolyte membrane 2 and back diffuses to the anode side, produced water also exists at the anode side.

Air is pressurized to a prescribed pressure by a compressor 7, such as a supercharger (S/C), and is supplied to the cathode 4 of the fuel cell 1 through an air supply path 8. After the air supplied to the fuel cell 1 is used for electricity generation, it is discharged, along with the produced water of the cathode side, from the fuel cell 1 to an air exhaust path 9, and introduced into the discharge-gas processing device 50 through a pressure control valve 10. Hereinafter, the air supplied to the fuel cell 1 is referred to as supply air, and the air discharged from the fuel cell 1 is referred to as discharged air to distinguish between them. Either supply air or discharged air may be used as diluent gas.

The hydrogen gas supplied from a hydrogen tank 15 flows through a hydrogen gas supply path 17, is decompressed to a prescribed pressure along the way by a regulator 16, controlled to a prescribed flow rate by a flow control valve 23, and supplied to the anode 3 of the fuel cell 1 through an ejector 19. The unreacted hydrogen gas which was not consumed is discharged as anode off-gas from the fuel cell 1, sucked by the ejector 19 through an anode off-gas path 18, merged with the fresh hydrogen gas supplied from the hydrogen tank 15 and supplied again to the anode 3 of the fuel cell 1. To wit, the anode off-gas discharged from the fuel cell 1 circulates through the fuel cell 1, passing the anode off-gas path 18 and the hydrogen gas supply path 17 downstream of the ejector 19. In this embodiment, the hydrogen gas supply path 17 downstream of the ejector 19 and the anode off-gas path 18 constitute a fuel gas circulation path 20.

An anode off-gas exhaust path 22 equipped with an exhaust valve 21 branches off from the anode off-gas path 18, and the anode off-gas exhaust path 22 is connected to the discharge-gas processing device 50. In this discharge-gas processing device 50, the anode off-gas discharged from the anode off-gas exhaust path 22 is diluted by the discharged air discharged from the air exhaust path 9, and then discharged to a discharge section through a mixed gas exhaust path 30.

Moreover, the discharge-gas processing device 50 is constituted to be able as required to discharge gas therein from the upper portion thereof through a gas venting path 32 by opening a gas venting valve 31. The gas venting path 32 is connected to an air exhaust path 33 to which air is supplied from a fan 34, with an ejector 35 provided at the connection with the gas venting path 32.

Electric power obtained by power generation of the fuel cell 1 is supplied to a load, such as a motor for driving a vehicle (not illustrated). Moreover, the rotation frequency of the compressor 7, opening of the pressure control valve 10 and the flow control valve 23, the exhaust valve 21, the gas venting valve 31, and the fan 34 are controlled by an electronic control unit (hereafter, ECU) 40.

In the fuel cell system constituted thus, as mentioned above power generation of the fuel cell 1 may become unstable during continuous operation due to an increased concentration of impurities (such as water and nitrogen) in the hydrogen gas flowing though the fuel gas circuit 20.

Therefore, when it is judged by the ECU 40 in this fuel cell system that the fuel cell system has been in continuous operation for a definite period of time, or when it is judged that the stability of power generation of the fuel cell 1 has dropped, determining there is a demand to discharge impurities, it opens the exhaust valve 21, intermittently discharges anode off-gas containing the impurities from the anode off-gas path 18 to the discharge-gas processing device 50 through the anode off-gas exhaust path 22, and controls the impurity concentration in the hydrogen gas which flows through the anode 3 of the fuel cell 1 to not exceed a predetermined value, and so maintains power generation of the fuel cell 1 in a stabilized state.

Figure 2:
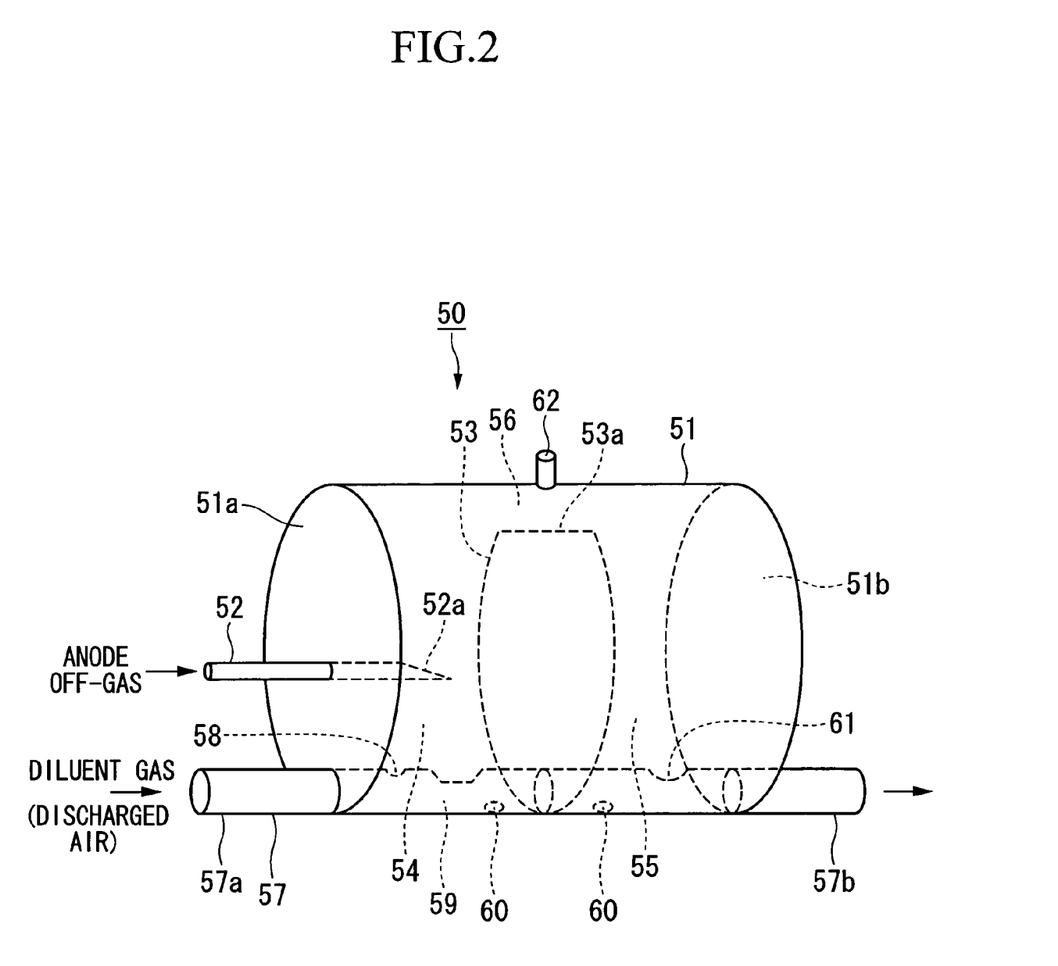
FIG. 2 is a perspective view of the discharge-gas processing device shown in FIG. 1.
Figure 3:
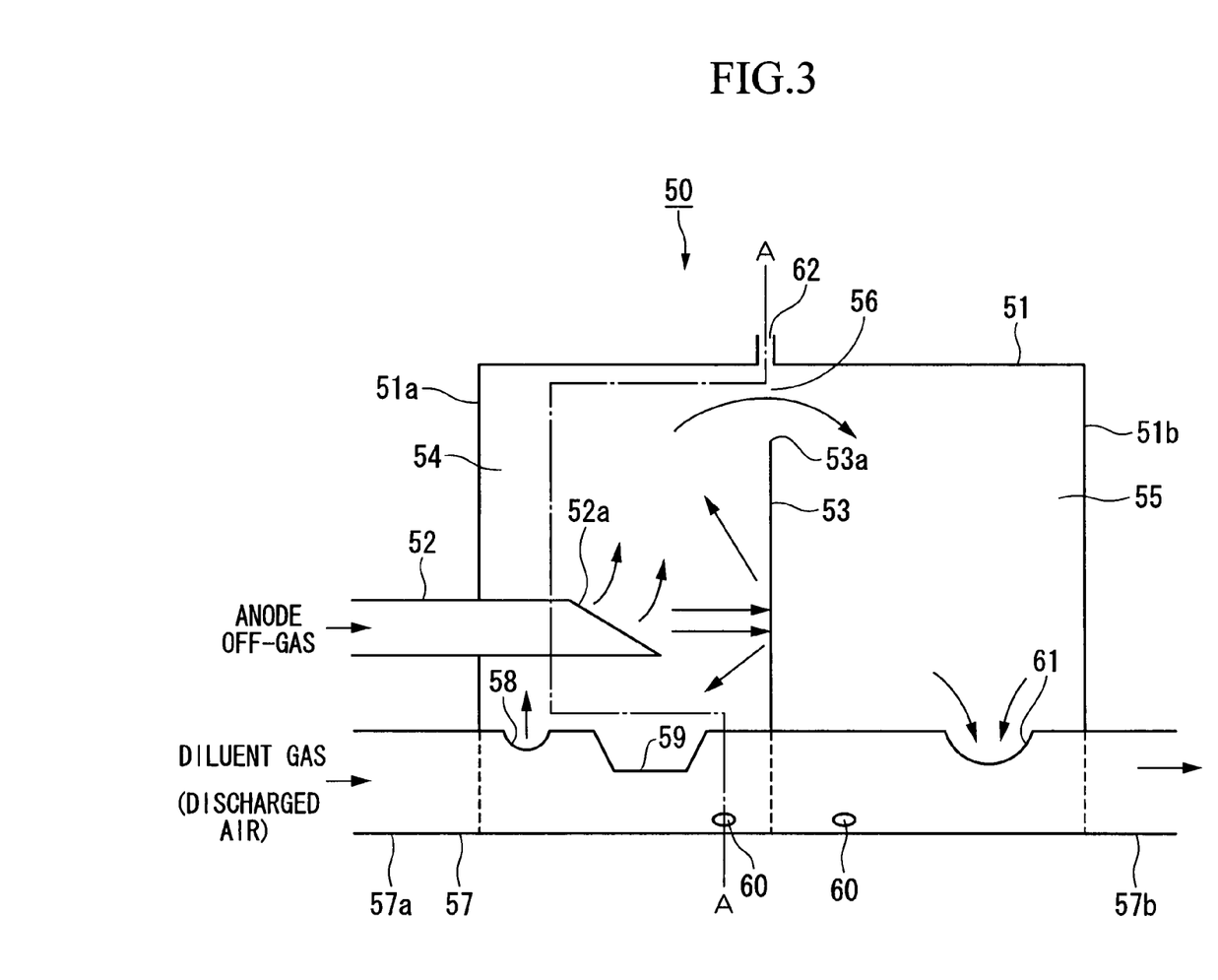
FIG. 3 is a cross-sectional view of the discharge-gas processing device shown in FIG. 2.
Figure 4:
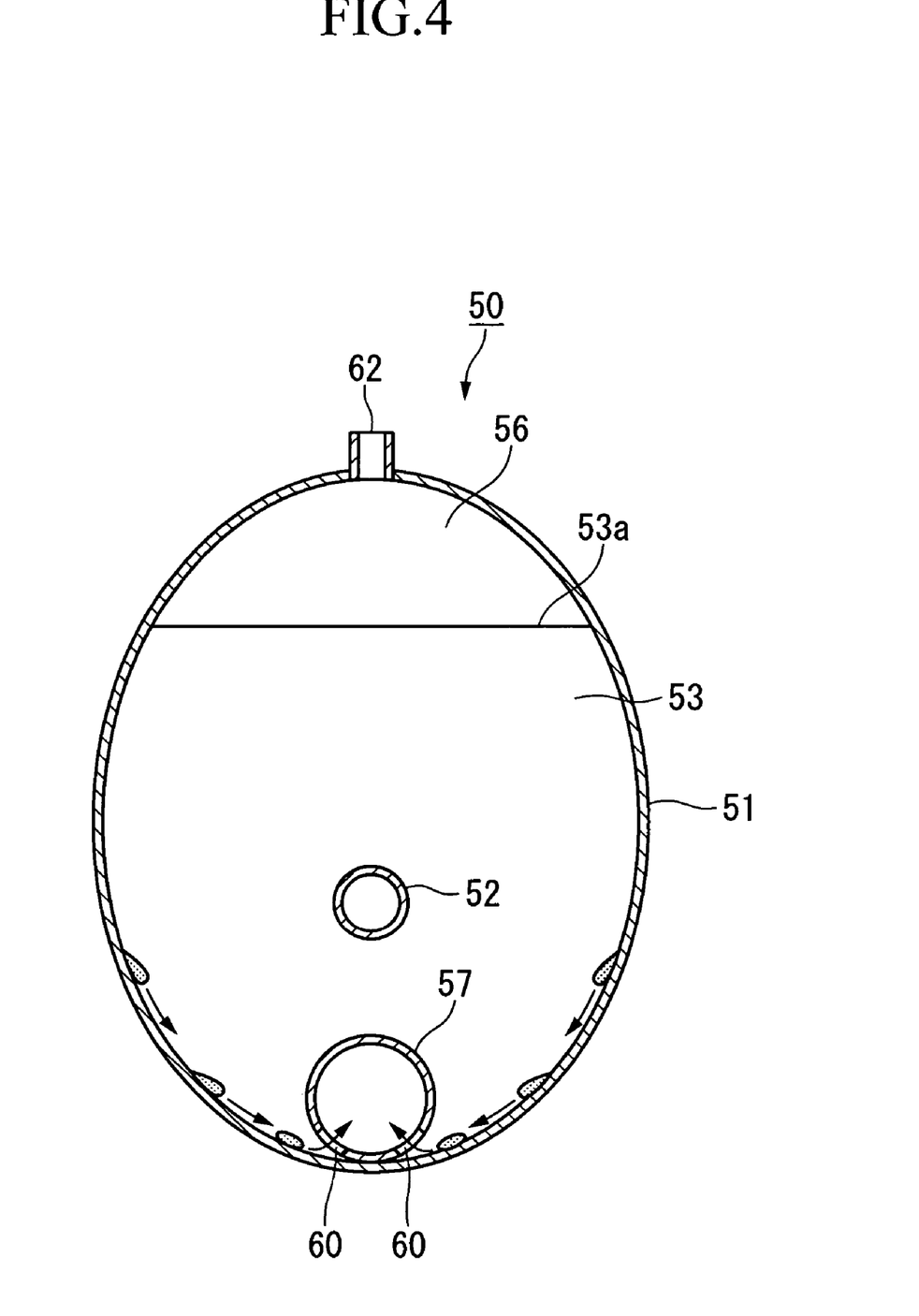
FIG. 4 is a cross-sectional view of the discharge-gas processing device taken along the line A-A shown in FIG. 3.

Next, the structure of the discharge-gas processing device 50 shall be explained in detail referring to the drawings of FIG. 2 to FIG. 4.

The discharge-gas processing device 50 is equipped with an airtight cylindrical dilution container 51. The dilution container 51 is provided in a vehicle with its axial center oriented in a substantially horizontal direction, with its cross-sectional shape perpendicular to the axial center direction forming an identical elliptical shape along the full length in the axial direction, and the long axis of this ellipse arranged in the vertical direction.

In other words, the axial center of the dilution container 51 is set in a substantially horizontal orientation, and its cross-sectional shape perpendicular to the axial center is composed of a curve forming a convex curve shape on the outside along the perimeter of the closed cross section.

An anode off-gas introduction pipe (anode gas introduction path) 52 arranged horizontally with its axial center slightly lower than the axial center of the dilution container 51 is passed through and fixed to an end plate 51a of one end side of the dilution container 51 in the axial direction. The distal end of the anode off-gas introduction pipe 52 inserted into the dilution container 51 is cut obliquely to be made into an anode off-gas emission hole 52a. The opening of the anode off-gas emission hole 52a is oriented obliquely upward. The anode off-gas exhaust path 22 is connected to the base end of the anode off-gas introduction pipe 52, so that when the exhaust valve 21 opens, anode off-gas is introduced into the dilution container 51 from the anode off-gas emission hole 52a.

Moreover, in the inside of the dilution container 51, a partition panel 53 is fixed forward of the distal end of the anode off-gas introduction pipe 52, in substantially the middle of the dilution container 51 in the axial direction, with a substantially vertical orientation. The partition panel 53 forms the shape of an ellipse with its upper portion cut away, and is closely fixed to the inner surface of the dilution container 51 except for a notch portion 53a. The inside of the dilution container 51 is divided by the partition panel 53 into an upstream chamber 54 communicating with the anode off-gas introduction pipe 52 and a diluent gas emission hole 58 to be described hereinbelow, and a downstream chamber 55 communicating with a mixed gas discharge hole 61 described hereinbelow, with the side above the notch portion 53a forming a communication gas path 56 that communicates with the upstream chamber 54 and the downstream chamber 55.

The notch portion 53a of the partition panel 53 is positioned sufficiently above the axial center of the dilution container 51, with the partition panel 53 existing on the axial extension of the anode off-gas introduction pipe 52. Accordingly, as shown in FIG. 3, most of the anode off-gas emitted from the anode off-gas emission hole 52a is emitted toward the partition panel 53, with a portion being emitted obliquely upward from the anode off-gas emission hole 52a.

Moreover, a top gas discharge hole (gas discharge hole) 62 is formed above the partition panel 53 in the dilution container 51, and the gas venting path 32 is connected to this top gas discharge hole 62.

Furthermore, a diluent gas pipe (diluent gas path) 57 that passes from the end plate 51a on one side of the dilution container 51 to an end plate 51b on the other side in the axial direction is fixed along the lowest portion (inner bottom) of the inner surface of the dilution container 51. This diluent gas pipe 57 also penetrates the partition panel 53. The air exhaust path 9 is connected to an upstream end portion 57a of the diluent gas pipe 57, and the mixed gas exhaust path 30 is connected to the downstream end portion 57b. The discharged air discharged from the cathode of the fuel cell 1 to the air exhaust path 9 passes through the diluent gas pipe 57 and is discharged to the discharge section through the mixed gas exhaust path 30.

The diluent gas emission hole 58 is provided in the portion of the diluent gas pipe 57 accommodated in the upstream chamber 54, in the vicinity of the end plate 51a. The diluent gas emission hole 58 opens at the top portion of the diluent gas pipe 57, and is provided at a position that is closer than the anode off-gas emission hole 52a of the anode off-gas introduction pipe 52 to the end plate 51a. This diluent gas emission hole 58 emits a portion of the discharged air flowing through the diluent gas pipe 57 to the upstream chamber 54. In addition, in this embodiment, since the diluent gas emission hole 58 is directly provided in the diluent gas pipe 57, the diluent gas emission hole 58 itself doubles as a communicating portion with the diluent gas emission hole 58 and the diluent gas pipe 57.

Here, since the anode off-gas emission hole 52a is oriented facing obliquely upward as described above, and the diluent gas emission hole 58 faces straight up, it can be the that the anode off-gas emission hole 52a and the diluent gas emission hole 58 are in a mutually non-opposing spatial relationship. Since this can prevent the anode off-gas emitted from the anode off-gas emission hole 52a from flowing backward in the diluent gas pipe 57 through the diluent gas emission hole 58, it can prevent discharge of insufficiently diluted anode off-gas.

Moreover, a constriction portion 59 that depresses the top portion of the diluent gas pipe 57 to reduce the opening area is provided in the portion of the diluent gas pipe 57 accommodated in the upstream chamber 54, downstream of the diluent gas emission hole 58. The constriction state (opening area) of the constriction portion 59 can adjust the flow rate of the discharged air introduced into the upstream chamber 54 from the diluent gas emission hole 58.

In addition, in this embodiment, the diluent gas pipe 57 is formed with a uniform pipe diameter except for the constriction portion 59.

Furthermore, drain holes 60 are provided in the diluent gas pipe 57, downstream of the constriction portion 59, at portions accommodated in each of the upstream chamber 54 and the downstream chamber 55. As shown in FIG. 4, paired left and right drain holes 60 are provided at the lower half portion of the diluent gas pipe 57, near the point of contact with the lowest part (inner bottom) of the inner surface of the dilution container 51. Liquid that accumulates at the inner bottom of the upstream chamber 54 or the downstream chamber 55 is drawn into the diluent gas pipe 57 through these drain holes 60.

In addition, in this embodiment, since the drain holes 60 are directly established in the diluent gas pipe 57, the drain holes 60 themselves become communicating portions of the drain holes 60 and the diluent gas pipe 57.

Moreover, a mixed gas discharge hole 61 is provided in the portion of the diluent gas pipe 57 accommodated in the downstream chamber 55, downstream of the drain holes 60 and near the end plate 51b. The mixed gas discharge hole 61 opens at the top portion of the diluent gas pipe 57, with gas in the downstream chamber 55 being discharged into the diluent gas pipe 57 through this mixed gas discharge hole 61.

In this embodiment, since the mixed gas discharge hole 61 is directly formed in the diluent gas pipe 57, the mixed gas discharge hole 61 itself doubles as a communicating portion with the mixed gas discharge hole 61 and the diluent gas pipe 57.

Next, the operation of the discharge-gas processing device 50 shall be explained.

In this discharge-gas processing device, always while supplying air from the compressor 7 to the cathode 4 of the fuel cell 1, the discharged air discharged from the cathode 4 of the fuel cell 1 is introduced into the diluent gas pipe 57 of the discharge-gas processing device 50 through the air exhaust path 9 and the pressure control valve 10, flows through the diluent gas pipe 57 toward the mixed gas exhaust path 30, with a portion of the discharged air flowing through the diluent gas pipe 57 being emitted from the diluent gas emission hole 58 into the upstream chamber 54.

On the other hand, as mentioned above, when the ECU 40 judges there to be a demand to discharge impurities, the exhaust valve 21 opens, anode off-gas is discharged from the anode off-gas path 18, introduced into the anode off-gas introduction pipe 52 of the discharge-gas processing device 50 through the anode off-gas exhaust path 22, and emitted from the anode off-gas emission hole 52*a* into the upstream chamber 54.

Accordingly, when anode off-gas is not emitted from the anode off-gas emission hole 52*a* to the upstream chamber 54, (to wit, when the exhaust valve 21 is closed), the pressure in the dilution container 51 hardly rises. However, when the exhaust valve 21 is open and anode off-gas is intermittently emitted from the anode off-gas emission hole 52*a* to the upstream chamber 54, the internal pressure of the dilution container 51 suddenly rises. That is, a pressure change occurs in the dilution container 51 according to the discharge cycle of the anode off-gas.

The dilution container 51 in this embodiment has a cross-sectional shape perpendicular to the axial center direction that consists of a curve (ellipse) forming a convex curve shape on the outside along the perimeter of the closed cross section. Therefore, the dilution container 51 has extremely high mechanical strength (pressure capacity) against internal pressure and deformation (repetitive stress) due to breathing of the dilution container, which can be sufficiently withstood without a special reinforcing structure. A special reinforcing structure is unnecessary, the discharge-gas processing device 50 can be easily manufactured.

As shown in FIG. 3, anode off-gas emitted from the anode off-gas emission hole 52*a* collides with the partition panel 53, altering its flow direction, and the collision with the partition panel 53 reduces its flow speed so that it spreads mostly throughout the inside of the upstream chamber 54 at a moderate flow speed. Thereby, while being partially mixed with the discharged air in the upstream chamber 54, the anode off-gas flows into the downstream chamber 55 through the communication gas path 56 and flows toward the mixed gas discharge hole 61. In the meantime, blending is further performed between the mixed gas flowing in from the upstream chamber 54 and the gas in the downstream chamber 55. The gas of the downstream chamber 55 is discharged from the mixed gas discharge hole 61 to the diluent gas pipe 57 to be further diluted by being mixed with discharged air flowing through the diluent gas pipe 57 before being discharged.

In this embodiment, the travel distance of the gas within the dilution container 51 can be lengthened by providing the partition panel 53. Furthermore, the travel distance of the gas in the dilution container 51 can also be lengthened even by disposing the diluent gas emission hole 58 in the vicinity of one end portion in the axial direction of the dilution container 51 and disposing the mixed gas discharge hole 61 in the vicinity of the other end portion in the axial direction of the dilution container 51. As a result, since the stagnation time of the gas in the dilution container 51 can be prolonged to be able to ensure sufficient time necessary for dilution, the anode off-gas can be reliably diluted.

In addition, as stated above, since the flow rate of the discharged air introduced into the upstream chamber 54 from the diluent gas emission hole 58 can be adjusted by the constriction state (opening area) of the constriction portion 59 provided downstream of the diluent gas emission hole 58 in the diluent gas pipe 57, by setting the constriction state (opening area) of the constriction portion 59 to a predetermined value, the flow rate of diluent gas emitted from the diluent gas emission hole 58 to inside the upstream chamber 54 can be set to the optimal flow rate for dilution of the anode off-gas, so that the anode off-gas can be discharged sufficiently diluted.

Moreover, water is contained in a liquid or gas (steam) state in the anode off-gas introduced into the dilution container 51 as mentioned above.

In this embodiment, the axial center of the anode off-gas introduction pipe 52 is disposed horizontally, and the distal end of the anode off-gas introduction pipe 52 is obliquely cut to form the anode off-gas emission hole 52*a*. This can prevent accumulation of liquid at the distal end of the anode off-gas introduction pipe 52, and can prevent blocking of the anode off-gas introduction pipe 52 by liquid accumulation.

Furthermore, in this embodiment, since the anode off-gas is emitted toward the partition panel 53 from the anode off-gas emission hole 52*a*, liquid contained in the anode off-gas collides with and adheres to the partition panel 53, and then falls along the vertically oriented partition panel 53. Moreover, condensation is promoted because the steam in the anode off-gas also collides with the partition panel 53, and this condensate also falls along the vertically oriented partition panel 53. That is, the partition panel 53 catches the moisture in the anode off-gas, aiding collection at the bottom of the dilution container 51.

Moreover, the water in the anode off-gas (liquid and steam) is caught also on the inner surface of the dilution container 51. Liquid adhering to the inner surface of the dilution container 51 and the condensate condensed on the inner surface of the dilution container 51 fall along the inner surface of the dilution container 51, as shown in FIG. 4.

In this embodiment, since the axial center of the dilution container 51 is provided in a horizontal orientation, and the cross-sectional shape perpendicular to the axial center direction forms a convex curve on the outside along the perimeter of the closed cross section, liquid can be reliably collected at the lowest portion of the dilution container 51 in the vertical direction (that is, the inner bottom portion of the dilution container 51), with no stagnation occurring at the other areas.

In particular, in this embodiment, since the cross sectional shape of the dilution container 51 is elliptical, and the long axis of this ellipse is disposed in the vertical direction, the flow speed of liquid that falls along the inner surface of the dilution container 51 can be quickened, and as a result, the liquid can be swiftly collected at the lowest portion (that is, the inner bottom portion) of the dilution container 51.

Liquid collected at the inner bottom portion of the dilution container 51 is thus drawn from the drain holes 60 into the diluent gas pipe 57, to be discharged to the mixed gas exhaust path 30 together with the mixed gas.

In this embodiment, since the drain holes 60 are provided in the lower half of the diluent gas pipe 57, at a position near the inner bottom portion of the dilution container, liquid that stagnates at the bottom of the dilution container 51 can be easily discharged, and the un-discharged liquid that remains in the dilution container 51 can be reduced, thereby enhancing drainage performance.

In addition, in this embodiment, since the constriction portion 59 is formed immediately upstream of the drain holes 60, stagnate liquid inside the dilution container 51 can be effectively sucked up. For this reason, liquid can be discharged promptly. The suction force can be increased because the pressure on the downstream side of the constriction portion 59 is less than the upstream side.

Moreover, while the fuel cell 1 is stopped, the slight amount of anode off-gas (hydrogen gas) which remains in the dilution container 51 may stagnate at the top portion. When this happens, opening the gas venting valve 31 can discharge the anode off-gas to the air exhaust path 33 via the gas venting path 32. In this case, activating the fan 34 forces air into the air exhaust path 33 through the ejector 35. Thereby, anode off-gas stagnated at the top portion of the dilution container 51 during stoppage of the fuel cell 1 can be diluted and discharged while being drawn by negative pressure of the discharged air. As a result, the anode off-gas in the dilution container 51 can be prevented from flowing backward upstream while the fuel cell 1 is stopped.

Moreover, in this embodiment, since the diluent gas emission hole 58, the mixed gas discharge hole 61, and the drain holes 60 are all directly provided in the diluent gas pipe 57, the structure of the discharge-gas processing device is simple.

Other Embodiments

The present invention is not limited to the aforementioned embodiment.

For example, in the aforementioned embodiment, the cross section of the dilution container was made elliptical, but it is also possible to be circular.

Also, in the aforementioned embodiment, discharged air (cathode off-gas) discharged from the cathode of the fuel cell was used as the diluent gas, but the diluent gas is not limited thereto.

Moreover, it is also possible not to provide the diluent gas emission hole, the mixed gas discharge hole, and the drain holes in the diluent gas path directly, but to provide these holes in branch pipes that branch from the diluent gas path.

Moreover, in this embodiment, although there was only one partition panel, there may be a plurality, for example, alternately arranged. In this case, among the plurality of partition panels, some of the partition panels form an upstream chamber and a downstream chamber, with places that communicate with the upstream chamber and the downstream chamber forming communication gas paths.

In addition, in the present embodiment, the partition panel is closely fixed to the inner surface of the dilution container except for the notch portion, but slits may be provided in the lowest portion of the partition panel. This is preferable since liquid inside the dilution container can move through the partition panel, and drainage can be performed at places where drain holes are not provided, such as when drain holes are only set in one of the upstream chamber and downstream chamber.

Moreover, although the communication path in the aforementioned embodiment is a cutaway portion, it may also be formed by piping.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fuel cell discharge-gas processing device that dilutes anode off-gas discharged from a fuel cell anode by mixing the anode off-gas with a diluent gas so as to produce a diluted gas and then discharges mixture of the anode off-gas and the diluent gas, comprising:
   a dilution container;
   an anode off-gas introduction path having an anode off-gas emission hole that emits the anode off-gas to inside the dilution container;
   a diluent gas path through which the diluent gas flows, having drain holes for discharging liquid inside the dilution container;
   a diluent gas emission hole, communicating to the diluent gas path, that emits the diluent gas flowing through the diluent gas path to inside the dilution container;
   a mixed gas discharge hole, communicating to the diluent gas path, that discharges mixed gas of the anode off-gas and the diluent gas mixed inside the dilution container more to the downstream side of the diluent gas path than the communication portion with the diluent gas emission hole;
   at least one partition panel, provided inside the dilution container, that divides the dilution container into an upstream chamber in which the anode off-gas introduction path and the diluent gas emission hole communicate, and a downstream chamber in which the mixed gas discharge hole communicates; and
   a communication gas path that communicates with the upstream chamber and the downstream chamber,
   wherein the anode off-gas emission hole is provided so as to emit anode off-gas toward the partition panel;
   wherein the anode off-gas emission hole and the diluent gas emission hole are set in a mutually non-opposing spatial relationship; and
   wherein the anode off-gas emission hole is constituted with an opening end facing obliquely upward formed at a distal end of the anode off-gas introduction path inserted into the dilution container, with the diluent gas emission hole facing upward to the opening, in order to prevent the anode off-gas emitted from the anode off-gas emission hole from flowing backward in the diluent gas path through the diluent gas emission hole.

2. The fuel cell discharge-gas processing device according to claim 1, wherein the communication gas path is arranged at the upper portion of the dilution container, and a gas discharge hole that discharges the gas in the dilution container to the outside is provided at the upper portion of the dilution container.

3. The fuel cell discharge-gas processing device according to claim 1, wherein the diluent gas emission hole is arranged in the vicinity of one end portion in the axial direction of the dilution container, and the mixed gas discharge hole is arranged in the vicinity of the other end portion in the axial direction of the dilution container.

4. The fuel cell discharge-gas processing device according to claim 1, wherein the diluent gas path is provided to penetrate the dilution container, and at least one of the diluent gas emission hole and the mixed gas discharge hole is directly provided in the diluent gas path.

5. A fuel cell discharge-gas processing device that dilutes anode off-gas discharged from a fuel cell anode by mixing the anode off-gas with a diluent gas so as to produce a diluted gas and then discharges mixture of the anode off-gas and the diluent gas, comprising:
   a dilution container;
   an anode off-gas introduction path having an anode off-gas emission hole that emits the anode off-gas to inside the dilution container;
   a diluent gas path through which the diluent gas flows;
   a diluent gas emission hole, communicating to the diluent gas path, that emits the diluent gas flowing through the diluent gas path to inside the dilution container;

a mixed gas discharge hole, communicating to the diluent gas path, that discharges mixed gas of the anode off-gas and the diluent gas mixed inside the dilution container more to the downstream side of the diluent gas path than the communication portion with the diluent gas emission hole; and a constriction portion provided in the diluent gas path and disposed between the region where the diluent gas emission hole communicates and the region where the mixed gas discharge hole communicates;

wherein the anode off-gas emission hole and the diluent gas emission hole are set in a mutually non-opposing spatial relationship, and wherein the anode off-gas emission hole is constituted with an opening end facing obliquely upward formed at a distal end of the anode off-gas introduction path inserted into the dilution container, with the diluent gas emission hole facing upward to the opening, in order to prevent the anode off-gas emitted from the anode off-gas emission hole from flowing backward in the diluent gas path through the diluent gas emission hole.

6. The fuel cell discharge-gas processing device according to claim 5, wherein the diluent gas path is provided to penetrate the dilution container, and at least one of the diluent gas emission hole and the mixed gas discharge hole is directly provided in the diluent gas path.

7. A fuel cell discharge-gas processing device that dilutes anode off-gas discharged from a fuel cell anode by mixing the anode off-gas with a diluent gas so as to produce a diluted gas and then discharges mixture of the anode off-gas and the diluent gas, comprising:

a dilution container;

an anode off-gas introduction path having an anode off-gas emission hole that emits the anode off-gas to inside the dilution container;

a diluent gas path through which the diluent gas flows;

a diluent gas emission hole, communicating to the diluent gas path, that emits the diluent gas flowing through the diluent gas path to inside the dilution container;

a mixed gas discharge hole, communicating to the diluent gas path, that discharges mixed gas of the anode off-gas and the diluent gas mixed inside the dilution container more to the downstream side of the diluent gas path than the communication portion with the diluent gas emission hole;

at least one partition panel provided inside the dilution container that divides the dilution container into an upstream chamber in which the anode off-gas introduction path and the diluent gas emission hole communicate, and a downstream chamber in which the mixed gas discharge hole communicates; and a communication gas path that communicates with the upstream chamber and the downstream chamber, wherein the diluent gas path is provided so as to penetrate the dilution container;

wherein the anode off-gas emission hole and the diluent gas emission hole are set in a mutually non-opposing spatial relationship; and wherein the anode off-gas emission hole is constituted with an opening end facing obliquely upward formed at a distal end of the anode off-gas introduction path inserted into the dilution container, with the diluent gas emission hole facing upward to the opening, in order to prevent the anode off-gas emitted from the anode off-gas emission hole from flowing backward in the diluent gas path through the diluent gas emission hole.

8. The fuel cell discharge-gas processing device according to claim 7, wherein the diluent gas path has drain holes for discharging liquid inside the dilution container.

* * * * *